United States Patent [19]

Ioka et al.

[11] 4,444,470

[45] Apr. 24, 1984

[54] MULTIBEAM OPTICAL MODULATION AND DEFLECTION APPARATUS

[75] Inventors: Akio Ioka; Koichiro Kurahashi, both of Amagasaki, Japan

[73] Assignee: Mitsubishi Denki Kabushiki Kaisha, Tokyo, Japan

[21] Appl. No.: 311,328

[22] Filed: Oct. 14, 1981

Related U.S. Application Data

[63] Continuation of Ser. No. 55,633, Jul. 6, 1979, abandoned.

[30] Foreign Application Priority Data

Jul. 14, 1978 [JP] Japan .................................. 53-86594

[51] Int. Cl.³ .............................................. G02F 1/11
[52] U.S. Cl. .................................... 350/358; 350/356; 372/26
[58] Field of Search ........................ 350/358, 356, 354; 346/1, 108; 378/26, 13

[56] References Cited

U.S. PATENT DOCUMENTS

| | | | |
|---|---|---|---|
| 3,744,039 | 7/1973 | Hrbek et al. | 350/358 |
| 3,796,495 | 3/1974 | Laub | 350/358 |
| 3,875,400 | 4/1975 | Pao et al. | 350/358 |
| 3,935,566 | 1/1976 | Snopko | 350/358 |
| 4,000,493 | 12/1976 | Spaulding et al. | 346/1 |

Primary Examiner—William L. Sikes
Assistant Examiner—Léon Scott, Jr.
Attorney, Agent, or Firm—Wenderoth, Lind & Ponack

[57] ABSTRACT

An acousto-optic deflector is supplied with a beam of laser light and driven in a parallel relationship with a plurality of high frequency signals to produce a plurality of diffracted deflected beams of laser light. The high frequency signals have phases independently controlled so as to prevent the resultant combination of the high frequency signals from having an excessively high peak-to-peak amplitude.

2 Claims, 5 Drawing Figures

MULTIBEAM OPTICAL MODULATION AND DEFLECTION APPARATUS

This is a continuation application of now abandoned application Ser. No. 55,633, filed July 6, 1979.

BACKGROUND OF THE INVENTION

This invention relates to a multibeam modulation and deflection apparatus for simultaneously driving a single acousto-optic deflector with a plurality of high frequency driving signals to split a beam of laser light incident upon the acousto-optic deflector into a plurality of output beams and also to modulate and deflect the output beams independently of one another. Particularly, the present invention concerns improvements in means for generating such high frequency driving signals to reduce spurious output beams.

It is known that a single acousto-optic deflector can be used to generate a plurality of diffraction-deflected beams of light. For example, such deflectors have begun to be utilized with high speed laser printers which include a laser as the source of light.

Conventional laser printers have comprised an acousto-optic deflector for receiving a beam of laser light, a driving source for simultaneously driving the acousto-optic deflector with a plurality of high frequency driving signals to cause the deflector to produce a plurality of output beams of laser light, each beam independently modulated and deflected with its respective high frequency driving signal, a rotary polygon-mirror for reflecting the output beams from the acousto-optic deflector in a direction perpendicular to the deflection angle of the output beams to form a set of parallel scanning lines, and a printing section for fixing images of the scanning lines formed by the output beams of laser light focussed thereon. In the system, the plurality of high frequency driving signals are individually placed in their ON or OFF state by associated printing data signals individually whereby data represented by the ON or OFF state of the output beams of laser light from the acousto-optic deflector are simultaneously printed, as a plurality of dots, by scanning lines whose number is equal to the number of driving signals. Thus a plurality of lines of data-dots are printed in a parallel relationship along with the scanning by the rotary polygon-mirror.

In the system, it is preferrable to increase the number of parallel printing dots or the number of oscillators generating the high frequency driving signals to obtain a higher printing speed. However, the number of oscillators is limited by the spurious diffraction caused by the nonlinear response of the acousto-optic deflector and an associated driving amplifier for the reasons as will be apparent later.

It is difficult to form an osscilator group including a plurality of oscillators having oscillation phases ideally random and independent of one another, because, with a multiplicity of independent oscillators provided, oscillation phases thereof tend to be pulled in one another. As a plurality of high frequency driving signals having equal phases are applied simultaneously to the acousto-optic deflector, a resultant driving signal thereof may have very large peak-to-peak amplitudes; the amplitudes may be large enough to cause the acousto-optic deflector to respond nonlinearly to the respective driving signals so as to cause the intermodulation of the signal components to thereby effect, in addition to the normal diffraction, spurious diffractions. This is true in the case of the driving amplifier. Therefore, the quality of printed data is much deteriorated. The more the number of the oscillators, the more the adverse influences become.

Accordingly, it is an object of the present invention to provide a new and improved multibeam optical modulation and deflection apparatus for modulating and deflecting a beam of laser light at a super high speed with a high quality by preventing a resultant driving signal composed of a plurality of high frequency driving signals generated by respective oscillators from having high peak-to-peak amplitudes so as to thereby avoid the nonlinear response of both an acousto-optic deflector and an associated amplifier so as to thereby reduce the spurious output beams.

SUMMARY OF THE INVENTION

The present invention provides a multibeam optical modulation and deflection apparatus comprising an acousto-optic deflector for receiving a beam of laser light, a driving means for generating a plurality of high frequency driving signals to drive the acousto-optic deflector, and a phase control means provided in the driving means to independently control the phases of the plurality of high frequency driving signals in accordance with a predetermined phase pattern, the acousto-optic deflector being simultaneously driven by the plurality of high frequency driving signals, controlled in phase, to thereby produce a plurality of output beams of laser light, the beams modulated and deflected independently of one another without any spurious output beam.

Preferably the phase control means may control the phases of the plurality of high frequency driving signals in accordance with phase patterns which have been predetermined for respective ON/OFF patterns of the resulting high frequency driving signals.

BRIEF DESCRIPTION OF THE DRAWINGS

The present invention will become more readily apparent from the following detailed description, taken in conjunction with the accompanying drawings in which.

DESCRIPTION OF THE PREFERRED EMBODIMENTS

Figure 1:
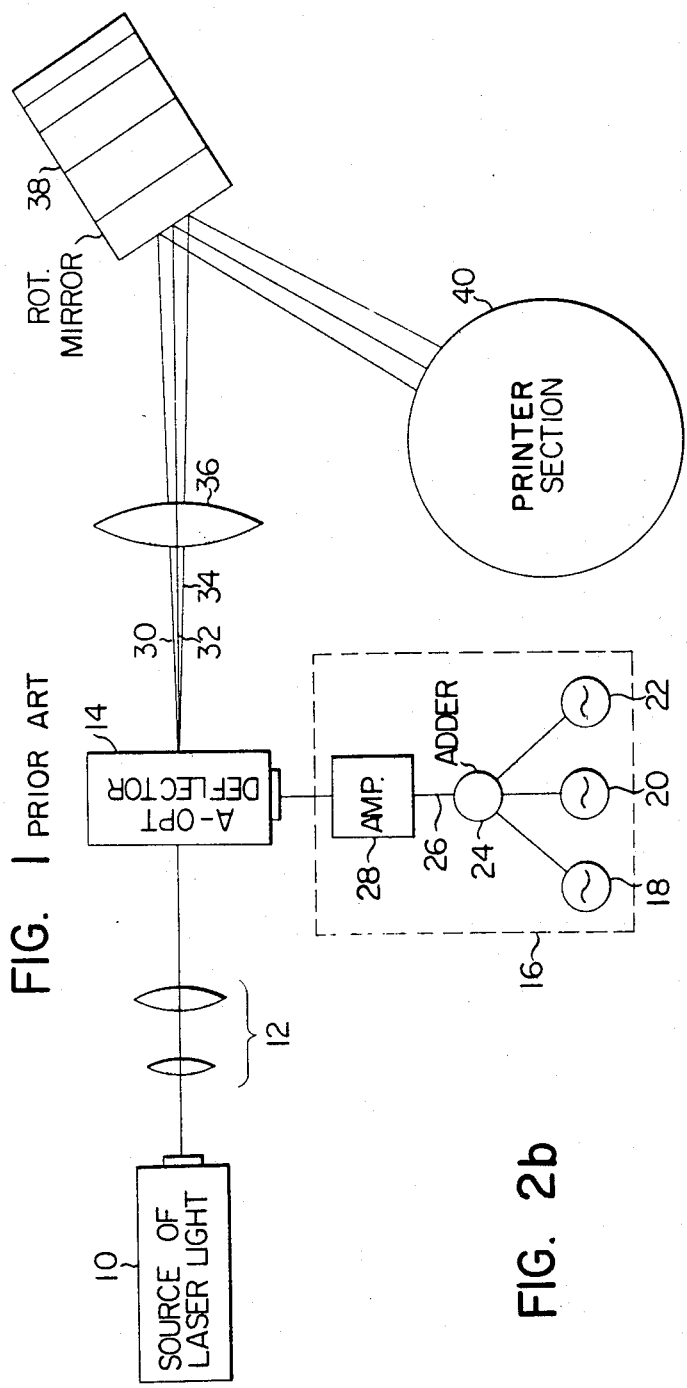
FIG. 1 is a schematic view of a conventional laser printer including a laser light as a source of light.

Referring now to FIG. 1 of the drawings, there is illustrated a conventional laser printer. In the arrangement illustrated, laser light emitted from a source of laser light 10 passes through a beam shaping system 12 to be converted to a desired beam of light which, in turn, falls on an acousto-optic deflector 14 driven by a driving source generally designated by the reference numeral 16. The driving source 16 includes a plurality of oscillators, in this case, three oscillators 18, 20 and 22 having different oscillation frequencies. High frequency driving signals from the oscillators 18, 20, and 22 are applied to an adder circuit 24 where they are combined into a multifrequency driving signal 26. After having been amplified by am amplifier 28, the multifrequency driving signal 26 is applied to the acousto-optic deflector 14 to simultaneously drive it with the plurality of high frequency driving signals included in therein.

The beam of laser light incident upon the acousto-optic deflector 14 is diffracted in response to each of the high frequency driving signals forming the multifrequency driving signal 26 applied to the acousto-optic deflector 14. That is, the light beam is split into a plurality of output beams, in this case, three output beams 30, 32 and 34 having diffraction angles corresponding to the respective frequency of the driving signals. The deflected output beams 32, 34 and 36 are passed through a focussing optical system 36 and then scanned in the direction perpendicular to the deflection angle rotary polygon-mirror 38 to form longitudinal scanning lines (not shown) on a printer section designated by 40. The number of the scanning lines is equal to the number of driving signals. The printer section 40 takes charge of fixing images formed by the scanning lines.

From the foregoing it will readily be understood that, by turning outputs from the respective oscillators on or off in correspondence with associated printing signals, data represented by the on or off state of the output beams from the acousto-optic deflector can be simultaneously printed, as a plurality of dots, on the scanning lines.

Conventional methods, such as described above in conjunction with FIG. 1, are advanced methods of providing the modulation of the beam of laser light at a high speed and of decreasing the speed of rotation of the rotary mirror 38 to scan the modulated beams at a high rate of scanning lines per unit time, and also of making the best use of the characteristics of existing acousto-optic deflectors. Since a fluctuation of the rotational axis of the rotary mirror directly affect the positional accuracy with which beams of laser light are scanned within the system, it is desirable to rotate the rotary mirror at a speed which is low as possible to thereby improve the stability of the mirror and prolong the useful lifetime thereof.

To this end, it is preferrable to increase the number of parallel-printing dots, or the number of oscillators disposed in the driving source 16 as much as possible within a permissible frequency band of an acousto-optic deflector involved. However, an increase in number of oscillators actually tends to pull the oscillation phases of the individual oscillators in one another. Therefore, it has been difficult to form a group of oscillators having oscillation phases ideally random and independent of one another.

The high frequency driving signals generated by respective oscillators, such as the oscillators 18, 20 and 22, may be expressed by $F_n = A_n \sin(2\pi f_n t + \phi_n)$ where $A_n$ and $f_n$ designate and amplitude and frequency of the driving signals respectively and $n = 1, 2, \ldots, N$, and it is assumed that their phases $\phi_n$ are in-phase, for example, $\phi_n = 0$. Under these circumstances, it is apparent that a resultant signal $F = \Sigma F_n$ may have high peak-to-peak amplitudes.

Figure 2A:
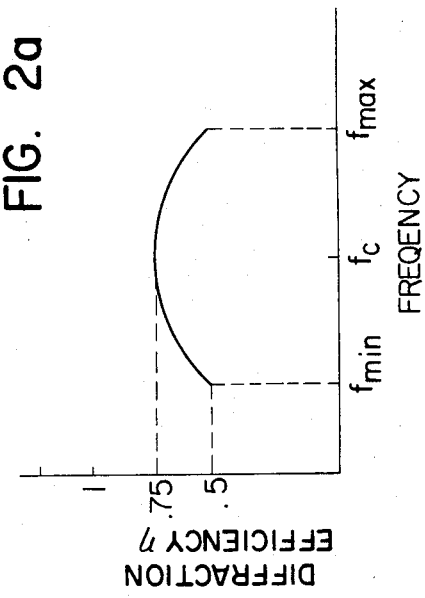
FIG. 2a is a graph illustrating the frequency dependency of the diffraction efficiency of the acousto-optic deflector shown in FIG. 1.
Figure 2B:
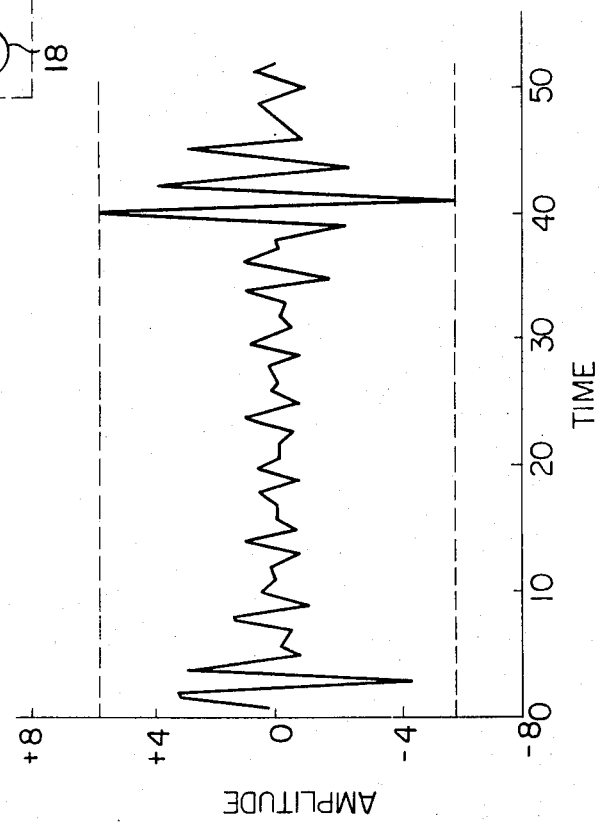
FIG. 2b is a graph illustrating a waveform of a multifrequency signal including a plurality of high frequency driving signal components having the same phases.

As an example, it is assumed that $N = 8$ and therefore the resultant signal or the multifrequency signal 26 includes eight frequency signal components and that the acousto-optic deflector 14 has a diffraction efficiency dependent upon frequency as shown in FIG. 2a wherein the diffraction efficiency $\eta$ is plotted on the ordinate against frequency on the abscissa. In FIG. 2a it is seen that the diffraction efficiency $\eta$ has a value of 0.75 at the central frequency $f_c$ and has a value of 0.5 at each of the upper and lower limits $f_{max}$ and $f_{min}$ of the operating frequency bandwidth of the deflector 14. Under the assumed condition, a computer is used to simulate the amplitude of the resultant signal F with amplitudes $A_n$ of the eight signal components equal in diffraction efficiency to one another and with the phases $\phi_n$ being null. The result of the simulation is shown in FIG. 2b wherein the axis the ordinate represents the instantaneous amplitude of the signal F and the axis of the abscissas represents time. As shown in FIG. 2b, a very large peak-to-peak amplitude is developed.

When the amplitude of the resultant driving signal 26 has a high peak-to-peak amplitude as shown in FIG. 2b, the amplifier 28 tend to be saturated with this high peak-to-peak amplitude of the signal 26 with the result that the amplifier 28 is not linerally responsive to the input signals $F_n$ (where $n = 1, 2, \ldots, N$). Accordingly, a nonlinear phenomenon is developed, in the amplifier 28 as well as in the acousto-optic deflector 14 and intermodulation occurs between the driving signal components. As a result, the deflector 14 produces spurious output beams of diffracted light, in addition to normal output beams diffracted with the components of the multifrequency signal 26. Those spurious beams of diffracted light grreatly deteriorate the quality of printed data.

The amplifier 28 would be able to broaden its range of linear response upon amplifying the resultant driving signal 26 having high peak-to-peak amplitude; however, this requires a very high power amplifier and is not economical. And also, because the dynamic range of the deflector 14 is finite, it can not be expected that the acousto-optic deflector 14 will produce output beams of laser light linearly with a resultant driving signal having high peak-to-peak amplitudes, unless the amplitude of each driving signal, $A_n$, is made quite small. This leads to the necessity of using a laser of much higher power and is also uneconomical. The larger the number of oscillators, such as the oscillators 18, 20 and 22, the more such adverse effects will be noticeable.

In order to eliminate the disadvantages of the arrangement shown in FIG. 1, there has been already known a driving source for an acouto-optic deflector including a plurality of oscillators having oscillation phases controlled independently of one another.

Figure 3:
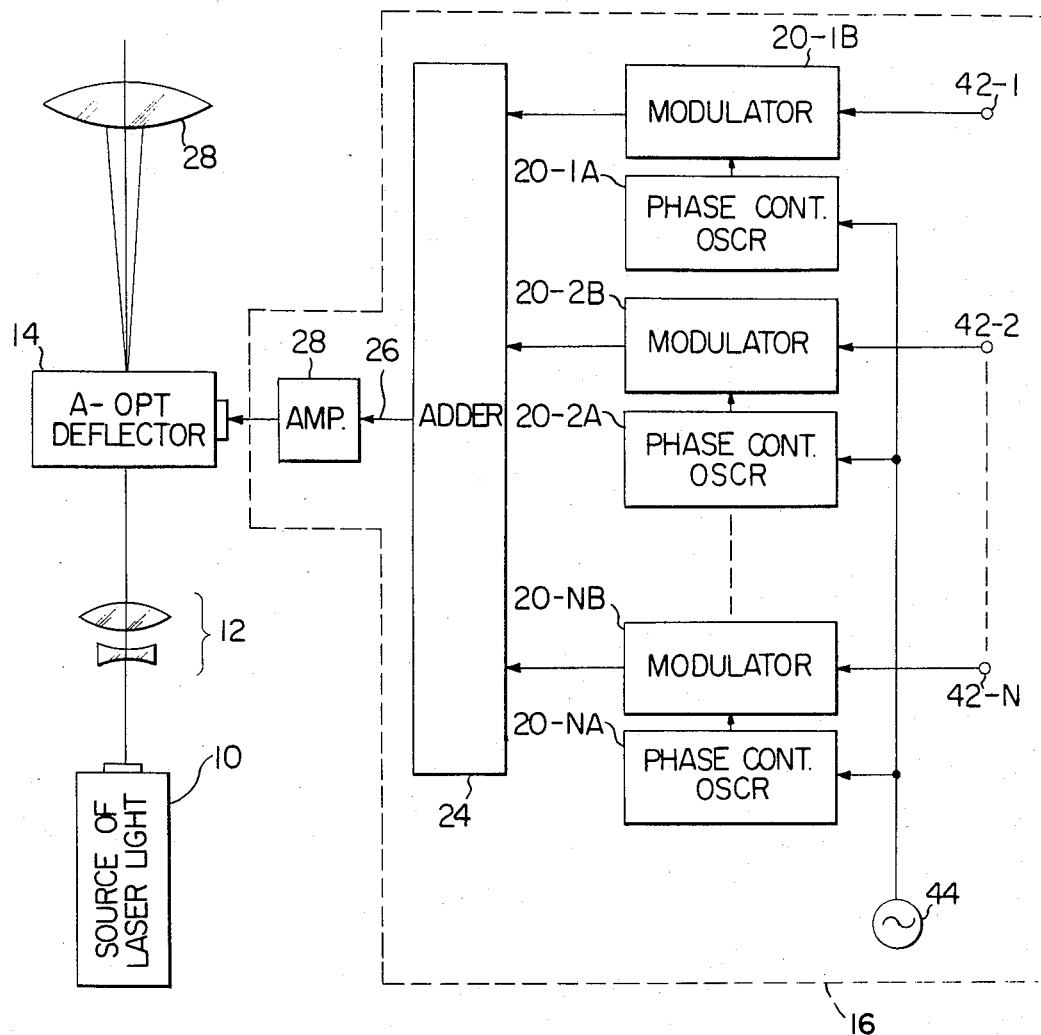
FIG. 3 is a block diagram of another conventional printing laser.

Referring now to FIG. 3, wherein like reference numerals designate the components identical or corresponding to those shown in FIG. 1, there is illustrated another conventional laser printer. The arrangement illustrated is different from that shown in FIG. 1 in the circuit configuration of the driving source 16.

The driving source 16 includes a plurality of phase controlled oscillatos 20-1A, 20-2A, . . . , 20-NA, connected to respective modulators 20-1B, 20-2B, . . . , 20-NB which are supplied with individual printing signals 42-1, 42-2, . . . , 42-N respectively and a reference oscillator 44 respectively connected to all of the oscillators 20-1A, 20-2A, . . . , 20-NA to impart a reference phase thereto.

The modulators 20-1B, 20-2B, . . . , 20-NB are all connected to the adder 24, whose output is subsequently connected to the amplifier 28. The resultant driving signal 26 from the adder 24 is amplified by the amplifier 28 and then applied to the acousto-optic deflector 14.

In FIG. 3, it is to be understood that the phase controlled oscillators 20-1A, 20-2A, ..., 20-NA are provided for effecting the phase control for each of the high frequency driving signals driving the acousto-optic deflector 14, resulting in the desired affect.

Each of the phase controlled oscillators may be, for example, formed of a phase locked loop type oscillator well known in the art.

In order to demonstrate the effect of the phase control, the waveform of the resultant driving signal 28 has been simulated by a computer under the conditions identical to the assumed conditions under which the waveform shown in FIG. 2b has been simulated except for the oscillation phases of the oscillators. More specifically, it has been assumed that the resultant driving signal 28 includes eight frequency signal components, that is, N=8, and that the acousto-optic deflector 14 has the frequency dependency on its diffraction efficiency as shown in FIG. 2a. However, the eight frequency signal components from the respective oscillators 20-1A, 20-2A, ..., 20-NA have been set to have respective phases, $\phi_n$, of $\pi$, $\pi$, 0, 0, 0, 0, $\pi$ and 0 in radians. The result of the simulation is shown in FIG. 4, wherein the axes of the ordinates and abscissas have the same meaning as those shown in FIG. 2b, and are graduated in the same units as in FIG. 2b.

Figure 4:
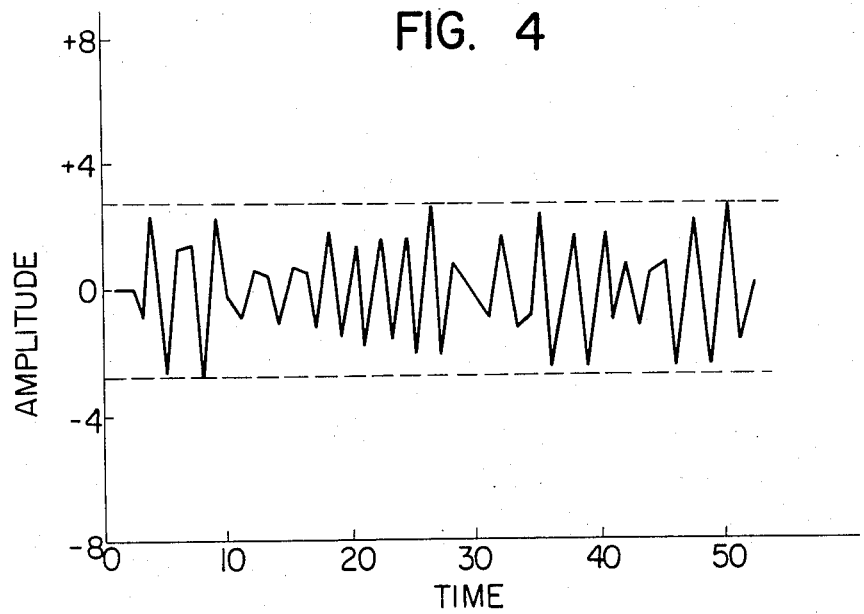
FIG. 4 is a graphical representation useful in explaining the effect of the arrangement shown in FIG. 3.

From FIG. 4 it is seen that the amplitude of the resultant driving signal is free from any high peak-to-peak amplitude. This results from the arrangement of the phases or the phase relationship as described above.

However, the optimum arrangement of phases varies with the number of printing dots and also with the frequency of printing signals put in their on state because the diffraction efficiency of the modulator has a non-uniform frequency characteristic. Therefore, a reduction in spurious diffracted beams due to the nonlinearily is not so effective unless the optimum arrangement of phases is determined.

The setting of the phases can be determined by an estimation function formed of either 1/P or Av/P where P designates the absolute peak value of the amplitude of the resultant driving signal and Av designates the mean value thereof. More specifically, a value of either 1/P or Av/P is computed with respect to each of individual arrangement of phases per each of the ON and OFF states of the N printing signals.

Figure 5:
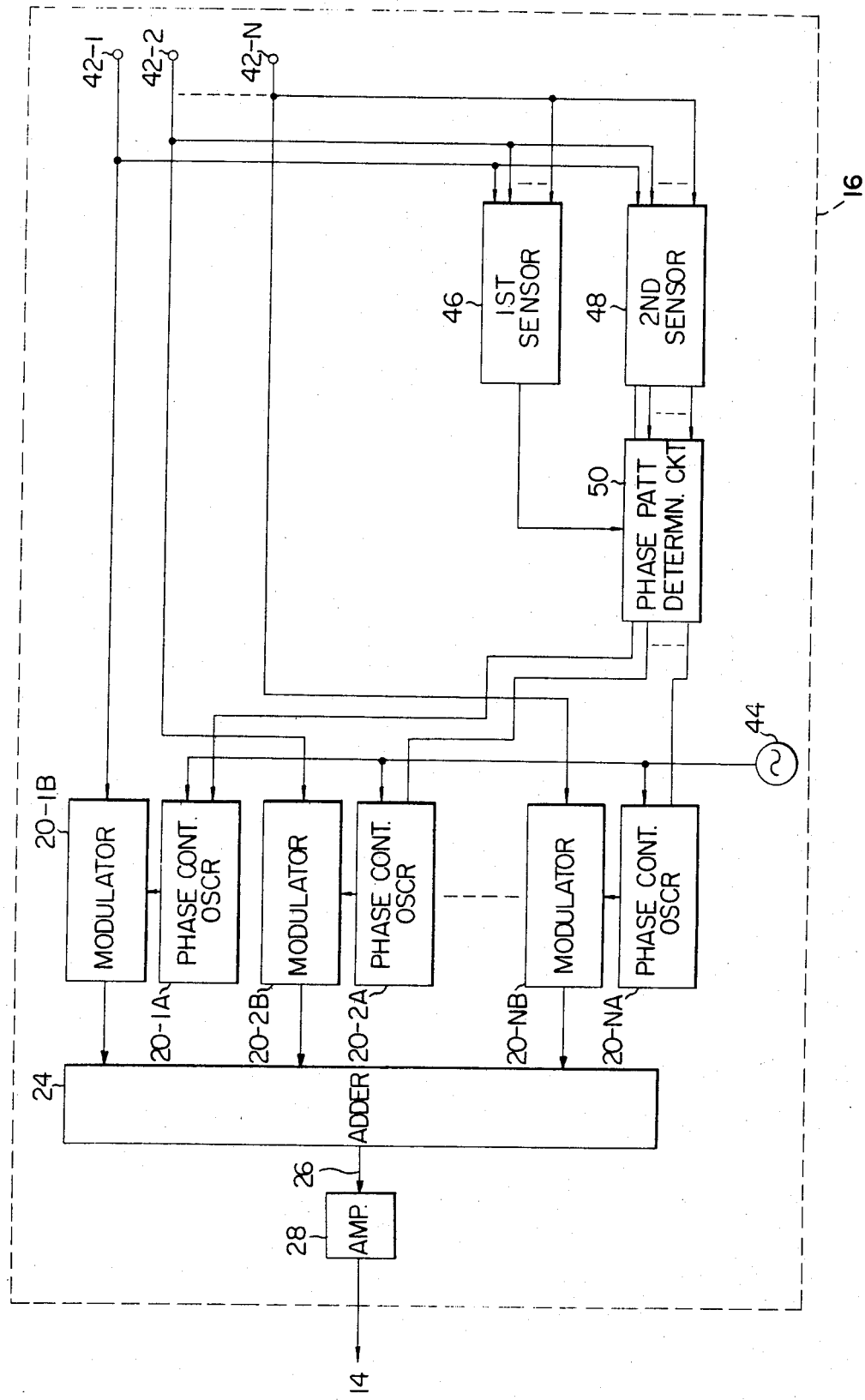
FIG. 5 is a block diagram of one embodiment according to the multibeam optical modulation and deflecton apparatus of the present invention.

FIG. 5 illustrates one embodiment according to the multibeam optical modulation and deflection apparatus of the present invention. In the arrangement illustrated, the printing signals 42-1, 42-2, ..., 42-N are applied to respective modulators 20-1B, 20-2B, ..., 20-NB, and to both a first sensor 46 for sensing the number of those printing signals which are in their ON state and a second sensor 48 for sensing which of the printing signals are in their ON state. Both sensors 46 and 48 are connected to a phase pattern determination circuit 50 which is, in turn, connected to the phase controlled oscillators 20-1A, 20-2A, ..., 20-NA. The phase pattern determination circuit 50 is connected to all the oscillators 20-1A, 20-2A, ..., 20-NA and has stored therein a plurality of different phase patterns into which the oscillation phases of all the oscillators are optimally arranged in accordance with the different values of the number and patterns of the printing signals put in their ON state as determined by using either one of the estimation functions as described above. The determination circuit 50 selects the optimum one of the stored phase patterns in response to values sensed by both sensors 46 and 48 and control the oscillation phases of the oscillators 20-1A, 20-2A, ..., 20-NA in accordance with the selected pattern. Therefore all the oscillators can oscillate with the optimum phases set in accordance with the status of the printing signals 42-1, 42-2, ..., 42-N.

From the forgoing it will readily be understood that the driving source 14 as shown in FIG. 5 produces the driving resultant driving signal 26 having a waveform including further suppressed peak-to-peak amplitudes as compared with the arrangement of FIG. 3 to thereby approximate an ideal waveform. This imparts a noticeable effect to the linearization of the response of the system.

It has been found that it is not necessary to store in the phase pattern determination circuit 50 these phase patterns most suitable for all the combinations of the printing signals and that the phase pattern determination circuit 50 may store, for example, one or a few phase patterns set for each value of the number of the printing signals placed in their ON state with a satisfactory result. Also it has been found that for a small number of the printing signals placed in their ON state, a single predetermined pattern may be effective.

The amplifier 28 applies to the acousto-optic deflector 14 (see FIG. 1) the resultant driving signal including signal components having the phase pattern as described above in conjunction with FIG. 4. Under these circumstance, the acousto-optic deflector 14 produces a plurality of beams of diffraction-deflected laser light. As in the case of conventional laser printers, the modulated, deflected beams of laser light delivered from the acousto-optic deflector 14 are passed through the focusing optical system 26 after which the beams are processed in the same manner as described above in conjunction with FIG. 1.

From the foregoing it is seen that, upon parallel-driving an acoustic-optic deflector with a plurality of high frequency driving signals, the present invention provides means for controlling phases of those signals so as to suppress the peak-to-peak amplitude of a resultant driving signal composed of the plurality of high frequency signals. Therefore, the acousto-optic deflector and its associated amplifier can reduce their nonlinear operating behavior to permit the system to be stably operated with a high diffraction efficiency of the acousto-optic deflector and with a decrease in power required for the amplifier. As a result, by making the best use of the characteristics of the existing acoustic-optic deflectors, the present invention can effect the high quality modulation and deflection of a beam of laser light at a super high speed. The effect of the phase control, as described above, has the feature that it becomes more noticeable as the number of parallel driving signals increase.

While the present invention has been illustrated and described in conjunction with a few preferred embodiments, it is to be understood that numerous changes and modifications may be resorted to without departing from the spirit and scope of the present invention.

What we claim is:

1. A multibeam optical modulation and deflection apparatus for receiving a plurality of input signals and for producing a plurality of laser beams, comprising:
   an acousto-optic deflector means for receiving a beam of laser light;

a driving means for generating a plurality of high frequency driving signals for driving said acousto-optic deflector, wherein said acousto-optic deflector is simultaneously driven by said plurality of high frequency driving signals so as to produce a plurality of beams of laser light which are modulated and deflected independently of one another;

a phase control means contained within said driving means for independently controlling phases of said plurality of high frequency driving signals in accordance with a phase control signal;

a first sensor for sensing the number of printing signals which are in an ON state and for providing an output corresponding thereto;

a second sensor for sensing the ON/OFF pattern of said printing signals and for providing an output corresponding thereto;

and a phase pattern determination circuit means which is connected to said first and second sensor outputs for storing therein a plurality of different phase patterns and for producing said phase control signal as an output used for controlling the phases of said plurality of high frequency driving signals;

wherein each of said stored phase patterns comprises a predetermined optimum phase pattern for each input signal ON/OFF pattern, and wherein said predetermined optimum phase pattern is selected by said phase pattern determination circuit means from said stored phase patterns in response to said outputs of said first and second sensors.

2. An apparatus according to claim 1, wherein the setting of each of said phases of said plurality of driving signals is determined by an estimation function signals to one of either 1/P or Av/P, where P designates the absolute peak value of the amplitude of the resultant driving signals and Av designates the means value thereof.

* * * * *